Feb. 17, 1948.   H. E. HARTIG   2,435,965
ELECTRICAL MOTOR CONTROL APPARATUS
Filed Oct. 9, 1942   3 Sheets-Sheet 1

Inventor
HENRY E. HARTIG.
By
George H. Fisher
Attorney

Patented Feb. 17, 1948

2,435,965

UNITED STATES PATENT OFFICE 2,435,965

ELECTRICAL MOTOR CONTROL APPARATUS

Henry E. Hartig, Robbinsdale, Minn., assignor to Minneapolis-Honeywell Regulator Company, Minneapolis, Minn., a corporation of Delaware Application October 9, 1942, Serial No. 461,403

17 Claims. (Cl. 318—29)

1

The present invention is concerned with a motor control system and more particularly with one in which the energization of the motor is controlled by an electronic discharge device.

An object of the present invention is to provide a motor control system in which the motor is controlled by a gas filled electronic discharge device in which a direct current voltage is applied to the gaseous discharge device continuously except for very brief intervals so that when the grid voltage is such as to call for the discharge device to energize the motor, such energization takes place substantially continuously.

A further object of the invention is to provide such a system in which the voltage applied to the grid is periodically increased for fixed periods of time.

A still further object of the invention is to provide such a system in which the number of periods of increased voltage applied to the grid bears a definite predetermined relation to the number of periods during which voltage is applied to the discharge device.

A further object of the present invention is to provide an arrangement in which the several increases in grid voltage applied during successive periods are of different magnitudes.

A further object of the present invention is to provide an arrangement in which the grid voltage of a grid controlled electronic discharge device is controlled by a resistance bridge and in which the voltage applied to the resistance bridge is periodically increased for periods of relatively short duration.

A still further object of the present invention is to provide an arrangement employing an electronic discharge device for controlling the energization of a current responsive element in which one means is applied for normally energizing the grid and in which a second means is applied for superimposing a further voltage upon the normal grid voltage for periods of extremely short duration.

Other objects of the invention will be apparent from a consideration of the accompanying specification, claims and drawings, of which

2

Figure 1:
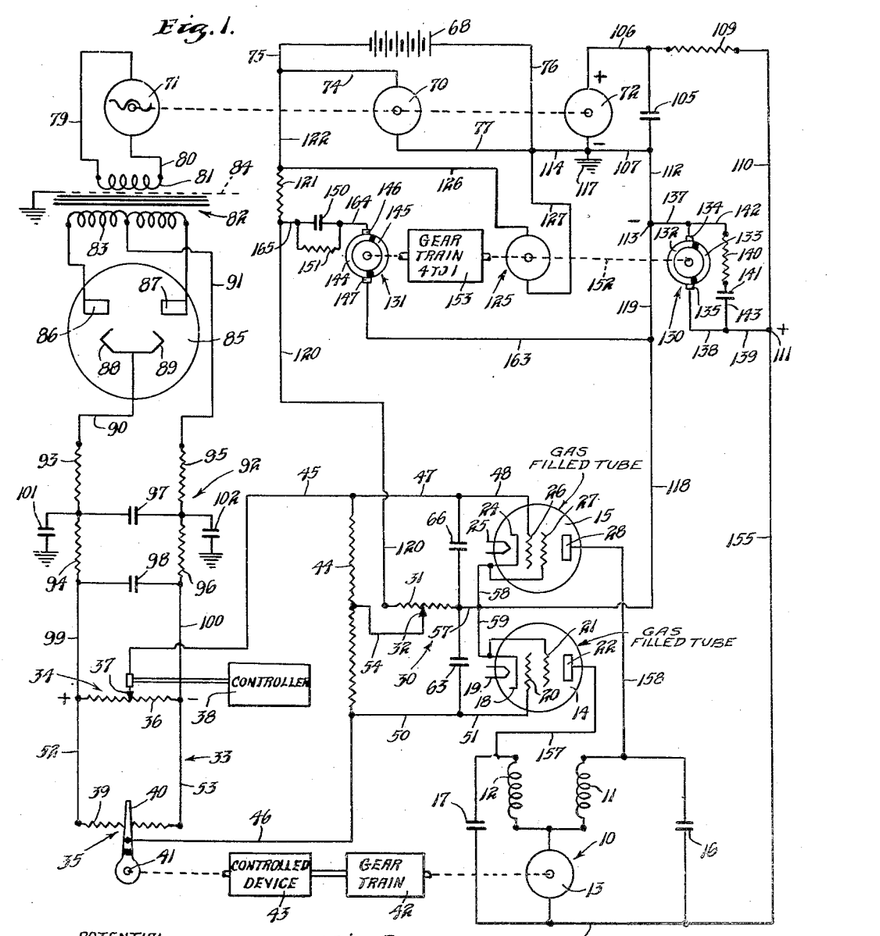
Figure 1 is a schematic view of one form of my motor control system.

Referring to the drawing for a more detailed understanding of my invention, the motor to be controlled is indicated by the reference numeral 10. This motor may be of any various types having a pair of direct current paths therethrough, the direction and rate of rotation of the motor depending upon the relative amounts of current flowing through the two paths. As shown in the drawing, the motor is a direct current motor having a plurality of field windings 11 and 12 connected in series with the armature 13 of the motor. When the current flow through field winding 11 is greater than that through field winding 12, the motor rotates in one direction. When, on the other hand, the current flows through field winding 12 is greater, the motor rotates in the opposite direction. A condenser 16 is connected in parallel with winding 11 and the armature 13. A second condenser 17 is connected in parallel with winding 12 and armature 13. The relative energization of field windings 11 and 12 is controlled by a pair of gas filled thermionic discharge devices 14 and 15. The discharge device or tube 14 comprises an envelope having a cathode 18, a cathode heater 19, a control grid 20, a shield grid 21, and an anode 22. The envelope is filled with a suitable gas. A tube which I have found particularly desirable for this purpose is the type 2050 gas filled tube. The discharge device or tube 15 is identical to discharge device 14 and comprises a cathode 24, a heater 25, a control grid 26, a shield grid 27, and an anode 28.

A potentiometer 30, comprising a resistance 31 and a slider 32, is employed to control the amount of bias voltage applied to the control grids 20 and 26.

The controlling voltage that is applied to the control grids 20 and 26 is obtained from a bridge circuit 33 including potentiometers 34 and 35. Potentiometer 34 constitutes the controlling potentiometer and comprises a resistance 36 and a slider 37. The slider 37 is connected by a link to a controller 38 which may be responsive to any desired condition. The controller 35 consists of a resistance 39 and a contact arm 40. The contact arm 40 is slidable over resistance 39. Contact arm 40 is angularly positioned by a shaft 41 which is insulated from contact arm 40. The shaft 41 is positioned by motor armature 13 through a gear train 42. The output end of the gear train 42 is connected to a controlled device 43 and to shaft 41. Thus, contact arm 40 is positioned in accordance with the position of a controlled device.

The resistors 36 and 39 are connected together by conductors 52 and 53 to form a resistance bridge. The slider 37 and the contact arm 40 constitute the output terminals of the resistance bridge. Contact 37 is connected by a conductor 45 to the upper terminal of a center tapped resistance 44. Contact arm 40 is connected by conductor 46 to the other terminal of resistance 44. Thus the output of the bridge 33 is impressed across resistor 44. The upper terminal of resistor 44 is connected by conductors 47 and 48 to control grid 26, while the lower terminal of resistor 44 is connected by conductors 50 and 51 to the grid 20. The center tap of resistor 44 is connected by a conductor 54, the slider 32, resistor 31, and conductor 57 to the junction of conductors 58 and 59 connected to cathodes 18 and 24, respectively. A condenser 65 is connected between grid 20 and cathode 18 and a similar condenser 66 is connected between grid 26 and cathode 24. These condensers act as filtering condensers as will be pointed out presently.

The power for operation of the system is obtained from a battery 68. In one proposed application of the system, the motor 13 is used to control elements connected with an airplane. In such a case, a direct current source of 24 volts is available. The battery 68 should accordingly be considered for purposes of illustration as a 24 volt battery. The battery 68 is employed to energize a combined generator and motor unit such as is commercially sold under the name of "Genemotor." In such a unit, a single armature is operated in a conventional manner as an armature of a direct current motor. Through auxiliary windings associated with the armature, voltages of various magnitudes can be obtained. This is conveniently indicated in the drawing by showing a motor 70 and plurality of generators 71 and 72. While in such a motor and generator unit there is only one armature, the motor and generators are schematically illustrated for convenience of illustration as though they each constituted a complete unit with an armature. The motor 70 is directly connected through conductors 74, 75, 76 and 77 across the battery 68. The alternating current generator 71 is employed to generate an alternating current voltage of approximately 120 cycles per second. The direct current generator 72 is designed to produce a direct current voltage of approximately 230 volts. The output of alternating current generator 71 is employed to energize the bridge 33. The output terminals of generator 71 are connected through conductors 79 and 80 to a primary winding 81 of a step-up transformer 82. The transformer 82 is provided with a center tapped secondary winding 83. A grounded electrostatic shield surrounds the secondary winding 83.

The secondary winding 83 is connected to the full wave rectifier tube 85. A tube which I have found particularly adaptable for this purpose is the 7Y4 tube. Such a tube comprises a pair of anodes 86 and 87 and a pair of filament cathodes 88 and 89. As is customary with such full wave rectifier circuits, the cathodes 88 and 89 are connected together and to a conductor 90 leading to one input terminal of a filter network 92. A conductor 91 connected to the center point of the secondary winding 83 is connected to the other input terminal of the filter network 92. The filter network 92 comprises a pair of resistances 93 and 94 in one side and a pair of resistances 95 and 96 in the other side. A condenser 97 is connected between the junctions of the two pairs of resistances and a further condenser 98 is connected across the output ends of resistors 94 and 96. The operation of the full wave rectifier tube 85 and the filter network 92 is entirely conventional and need not be described in detail here. Upon the transformer 82 being energized, the tube 85 acts to impress across input terminals of the filter network a full wave rectified voltage. This voltage in passing through the filter network is smoothed out so that the voltage across the output terminals consists of a substantially constant direct current voltage. The output terminals of resistors 94 and 96 are connected by conductors 99 and 100 to the opposite ends of resistor 36 and hence serve to impress across the input terminals of the resistance bridge 33 the direct current voltage supplied by the action of transformer 82, rectifier tube 85, and the filter network 92. A pair of condensers 101 and 102 are connected between the junctions of resistors 93 and 94 and resistors 95 and 96 and ground. Condensers 101 and 102 serve to by-pass any disturbances that might exist between the conducting network and ground.

The direct current generator 72 is employed to supply power to the output circuits of discharge devices 14 and 15 and hence to energize the motor 10. A filter condenser 105 is connected by conductors 106 and 107 directly across the output terminals of generator 72. The condenser 105 functions to filter out any small ripples that may exist in the output of generator 72. A resistor 109 is connected in series with conductor 106 and serves as a buffer between armature 72 and short-circuiting contactor 130 to limit the current. Resistor 109 is in turn connected by conductor 110 to a terminal 111 which will hereafter be referred to as the positive terminal of the power supply for the output circuits of discharge devices 14 and 15. The conductor 107 is connected by a conductor 112 to a terminal 113 which will be hereinafter referred to as the negative terminal of this power supply. For simplification, the further circuits traced in connection with the operation of the system will be traced from terminals 111 and 113 rather than from the generator 72.

The conductor 107, connected to terminal 113 by conductor 112, is also connected by conductors 114 and 76 to the positive side of the battery 68. The junction of conductors 107 and 114 is connected to ground at 117. Thus, the terminal 113 is at ground potential which potential corresponds to the positive potential of the battery 68 and the negative potential of generator 72.

The resistor 31 of potentiometer 30, previously referred to, is connected by conductors 57, 118 and 119 to terminal 113 which, as previously indicated, is connected by conductors 112, 107, 114, and 76 to the positive terminal of battery 68. The other end of resistor 31 is connected by conductor 120, protective resistor 121 and conductors 122 and 75 to the negative terminal of battery 68. It will accordingly be seen that resistor 31 is connected across the terminals of battery 68 so that the voltage existing across battery 68 is applied across resistor 31. The right-hand end of resistor 31 tends to be positive and the left-hand end negative. As previously explained, the right-hand end (the positive end) is connected to cathodes 18 and 24. The slider 32 is connected through conductor 54 to the center tap of resistor 44 and through this resistor to the two control grids 20 and 26. The potentiometer 30 thus serves to apply a portion of the voltage existing between the control grids and the cathodes 15 and 16 in such a manner as to bias these grids negatively with respect to the cathodes.

My motor control system employs means to periodically remove the voltage from the plate circuit and means to increase the magnitude of the grid voltage. These means will now be described.

A direct current motor is indicated by the reference numeral 125. One terminal of this motor is connected by conductors 126, 122 and 75 to the negative terminal of the battery. The other terminal is connected by conductors 127 and 76 to the positive terminal of the battery. Motor 125 is employed to drive rotary contactors 130 and 131. The rotary contactor 130 consists of a drum including conductive bars 132 and 133 separated by insulating material. Associated with the drum are a pair of brushes 134 and 135. The brushes 134 and 135 are so arranged with respect to the conductive bar 132 that during a very small portion of each half revolution of the rotor, a conductive circuit is established between brushes 134 and 135 through conductive member 132. At all other times, the brushes 134 and 135 are insulated from each other either by reason of one of the brushes engaging an insulating segment or by reason of the brush 134 engaging one of the conductive members and brush 135 the other.

The brush 134 is connected by conductor 137 to terminal 113. Brush 135, on the other hand, is connected by conductors 138 and 139 to terminal 111. It will thus be seen that the contactor 130 serves to periodically establish a conductive path between terminals 111 and 113. A resistor 140 and a condenser 141 are connected by conductors 142, 143 and 138 between brushes 134 and 135. The resistor and condenser are employed to provide a low impedance shunt for high frequency voltages across brushes 134 and 135 and hence to minimize any tendency towards sparking between brushes 134 and 135 and the conductive member 132.

The rotary contactor 131 is similar in construction to the contactor 130. Contactor 131 thus comprises a rotor having conductive bars 144 and 145 separated by insulating material. Cooperating with the rotor are brushes 146 and 147. As with contactor 130, the brushes 146 and 147 are electrically connected by a conductive segment 144 for a very brief interval during each half revolution of the rotor. A condenser 150 is connected in series with brushes 146 and 147. Connected in parallel with condenser 150 is a resistor 151 which has a relatively high resistance value although capable of discharging condenser 150 within a relatively short period of time.

The motor 125 is connected by a shaft 152 directly to the rotor of contactor 130. The motor 125, however, is connected to the rotor of contactor 131 through a reduction gear train 153, which gear train provides a reduction in speed of four to one. Hence, contactor 131 is rotated only one-fourth as fast as contactor 130 so once every four times that a circuit is established between brushes 134 and 135, a circuit is established between brushes 146 and 147.

*Operation*

As previously indicated, the terminals 111 and 113 constitute the terminals of a direct current voltage supply for the output circuits of triodes 14 and 15. Thus, a circuit may be traced through the triode 14 and field winding 12 as follows: from positive terminal 111 through conductors 155 and 156, armature 13, field winding 12, conductor 157, anode 22, cathode 18, and conductors 59, 118 and 119 to the negative terminal 113. Similarly, a circuit may be traced from terminal 111 through conductors 155 and 156, armature 13, field winding 11, conductor 158, anode 28, cathode 24, and conductors 58, 118 and 119 to the negative terminal 113. If it were not for the contactor 130, these connections would serve to impress across the anodes and cathodes of tubes 14 and 15 a continuous direct current voltage. In view of the fact, however, that a gaseous discharge device of the type of devices 14 and 15 will continue to conduct a current once the grid potential has risen sufficiently to initiate a conductive discharge, it is necessary to periodically remove the voltage from the anode circuit in order to determine whether the grid voltage is still such as to call for a conductive discharge. The contactor 130 serves this purpose. It will be obvious that each time brushes 134 and 135 are conductively connected, a direct conductive connection is established between terminals 111 and 113, which conductive connection establishes a shunt across the motor 10 and the discharge devices 14 and 15. As previously noted, condenser 16 is connected in parallel with winding 11 and armature 13, and condenser 17 in parallel with winding 12 and armature 13. Thus when an energizing circuit is established through winding 11, condenser 16 becomes charged and when an energizing circuit is established through winding 12, condenser 17 becomes charged. In either case, the lower terminal will be the positive terminal. When terminals 111 and 113 are electrically connected by contactor 113, the condenser is effective momentarily to apply to the associated tube plate electrode a voltage opposite in polarity to that applied by the power source. Thus, considering the case in which the tube 15 is conductive so that current flows through winding 11 and condenser 16 is charged, the following circuit is established when contactor 130 connects terminals 111 and 113; from the lower positive terminal of condenser 16 through conductors 155, 139, and 138, brush 135, conductive bar 132, brush 134, conductors 137, 119, 118 and 58 to cathode 24, anode 28, and conductor 158 to the other terminal of condenser 16. The establishment of this circuit tends to apply across the anode and cathode of tube 15 a voltage of such polarity that the cathode 24 is positive and the anode 28 negative. In other words, this voltage is of the opposite polarity to that normally applied by the generator 72. This effect is of very brief duration due to the fact that the condenser 16 rapidly discharges through winding 11 and armature 13. However, this temporary voltage in the opposite direction exists sufficiently long to insure the termination of any discharge through tube 15.

It will be obvious that the same condition occurs when a tube 14 is conductive and a circuit exists through tube 14 and winding 12. In this case, the condenser 17 is the one which is charged and upon terminals 111 and 113 being connected by the contactor 130, a circuit is established as follows: from the lower positive terminal of condenser 17 through conductors 156, 155, 139, and 138, brush 135, conductive bar 132, brush 134, conductors 137, 119, 118, and 59, cathode 18, anode 22, and conductor 157 to the other terminal of condenser 17. The establishment of this circuit tends to impress a positive voltage on the cathode 18 in the same manner as was done in connection with tube 15. Again, this effect is of very brief duration due to the discharge of condenser 17 through winding 12 and armature 13. Thus the potential of either anode 22 or anode 28 is that indicated by the line 160 of Figure 2 where line 161 indicates the cathode potential.

It is desirable if the tubes are to be operated efficiently that the periods in which the potential is removed from the anode circuit be relatively short. In one embodiment of my invention, it was found desirable to apply a voltage to the anode for approximately 1/30 of a second and to reverse the voltage for 1/300 of a second. Thus, the intervals during which the voltage was applied were about ten times the length of the intervals during which the voltage was reversed.

As previously explained, the output voltage of the bridge 33 is applied to resistor 44. Also, as previously explained, the potentiometer 30 applies a voltage between the grids and cathodes which biases the grids negatively with respect to the cathodes by an amount dependent upon the setting of slider 32. Connected in series with this biasing voltage is a voltage existing across one-half of the resistor 44. When the bridge 33 is completely balanced, as is shown, no voltage exists across resistor 44. Consequently, the grids 20 and 26 are biased negatively to a substantial degree, as determined by the setting of slider 32.

The contactor 131 is effective periodically to remove a greater portion of the biasing potential from the grids and hence to raise the potential of these grids. Whenever the position of the rotor of contactor 131 is such that brushes 146 and 147 are conductively connected, the resistor 31 is shorted out by the following circuit: from the right-hand end of resistor 31 through conductors 57, 118 and 163, brush 147, conductive bar 144, brush 146, conductor 164, condenser 150, and conductors 165 and 120 to the left-hand end of resistor 31. The condenser 150 is of such capacity as to constitute an effective short circuit across resistor 31 momentarily after brushes 146 and 147 are conductively connected. Thus, during this time which need be only as great as the ignition time of the gaseous triode, a matter of several micro-seconds, there is substantially no potential existing across resistor 31 so that the slider 32 is at nearly the same potential as cathodes 18 and 24. In other words, the voltage biasing the grids negatively with respect to the cathodes is removed so as to raise the grid voltage sharply to substantially that of the cathode, disregarding any voltage that might exist because of the unbalance of the bridge. As soon as condenser 150 is charged, the voltage of battery 68 less a small drop due to 151 is again impressed across resistance 31, and when the brushes 146 and 147 are electrically separated, the biasing voltage is restored completely to its original value. Before brushes 146 and 147 are again connected during the next following cycle of operations, any charge on condenser 150 has leaked off through resistor 151 so that the condenser 150 is again capable of establishing a momentary low impedance path. The resistor 121 previously referred to limits the current flowing from the battery 68 to condenser 150 when the brushes 146 and 147 are first connected by bar 144 and thus increases the "time-constant" of the short-circuiting device. In other words, the resistor 121 functions to increase the time that resistor 31 is effectively short circuited, in all, however, a matter of microseconds.

Figure 2:
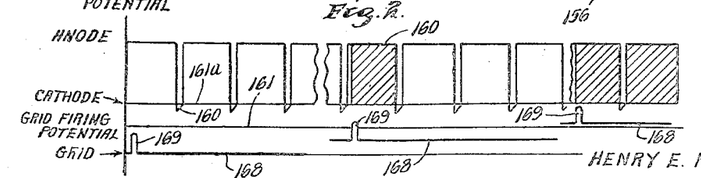
Figure 2 is a diagrammatic representation of the grid and plate voltages in such a system.

Referring to Figure 2, the instantaneous potential of the grid with respect to the cathode is indicated by the line 168. The critical grid firing potential is indicated by the line 161 and the cathode potential by the line 161a. The peaks in the grid voltage have been designated by the reference numeral 169. The condition at the extreme left-hand end of Figure 2 is that which exists when the bridge 33 is substantially balanced, as shown in the drawing. At this time, the level of the main portion of line 168 is determined solely by the adjustment of slider 32 with respect to resistor 131. In other words, the average potential of grids 20 and 26 with respect to the cathode is that due to the biasing means. Under these conditions, the peak 169 does not rise quite to the critical grid firing potential that is to line 161 so that the tubes 14 and 15 remain non-conductive.

Let it be assumed now that the condition to which the controller responds is such as to cause the slider 37 to move to the right. When this happens, the potential of tap 37 becomes negative with respect to slider 40. This causes a voltage to be impressed across resistor 44, the polarity of which is such that the lower end of resistor 44 is positive with respect to the upper end. As a result, the lower end of resistor 44 is positive with respect to the center tap while the upper end of resistor 44 is negative with respect to the center tap. Since the grid 26 is connected to the upper end of resistor 44, the effect of this upper end being made more negative with respect to the center tap is to lower the potential of grid 26 still more with respect to cathode 24 so as to preclude a conductive discharge through the tube. Since the grid 20 is connected to the lower end of resistor 44, the raising of the potential of the lower end with respect to the center tap increases the potential of grid 20 with respect to the cathode 18. In other words, the effect produced is that indicated in the intermediate portion of Figure 2. It will be observed that the grid potential is still not sufficient to cause a conductive discharge through tube 14 under normal conditions of the grid voltage. When, however, the contactor 131 is effective momentarily to establish the short circuit condition across the resistor 31 to raise the grid voltage, as previously explained, the grid potential is raised to a sufficiently high value as to cause the tube 14 to discharge. Since such a gas filled discharge device remains conductive after it has once broken down, as long as voltage is applied thereto, the tube will remain conductive until the contactor 130 reverses the voltage on the anode circuit. Hence, the tube will pass current during the remaining portion of the period after the peak grid voltage is applied as indicated by the shading applied to the first cycle of the intermediate portion of Figure 2. Since the amount of unbalance of the bridge is sufficiently low that the grid potential is normally not above the cut-off point, the tube will remain non-conductive during the next three cycles. Thus, the tube 14 will be conductive only one fourth of the total time.

When the tube 14 is rendered conductive in the manner described, current flows over the anode circuit of tube 17 previously traced, this circuit extending from terminal 111 through the armature 13, field winding 12 and the anode and cathode of tube 14 back to the terminal 113. The effect of the flow of this current is to energize field winding 12 and armature 13 in such a manner as to cause rotation of the armature 13 in a predetermined direction. The rotation of this armature in turn causes the controlled device 43 to be shifted in position. Also, the contact arm 40 is moved to the right so as to tend to assume a position corresponding to the position of contact 37 and so as to rebalance the bridge 33.

Under normal conditions, the bridge will be rebalanced so that no voltage will be impressed across resistor 44 and so that the voltage impressed on the grids 20 and 26 will again assume the value indicated in the extreme left-hand portion of Figure 2. Under the conditions just described, in which the tube 14 is energized only one-quarter of the time, the motor adjusts the control device 43 and the contact arm 40 very slowly. This is advantageous in that it prevents overshooting of the control system with resultant hunting.

Let it be assumed that the condition to which the controller is responsive is changing sufficiently fast that the slider 37 is moved further to the right than in the case just considered. Under these conditions, the amount of unbalance may be shifted sufficiently so that the grid voltage assumes the condition shown in the extreme right-hand portion of Figure 2. When this happens, the potential of the grid 20 is at all times above the cut-off potential so that the tube 14 will be conductive during every cycle. In other words, the tube 14 will be continuously conductive except during the brief intervals in which the contactor 130 is operating to establish a circuit between terminals 111 and 113. Under these conditions, the motor 10 will move continuously to rebalance the bridge. This continuous movement will occur until the bridge is sufficiently rebalanced as to result in the condition shown in the center portion of Figure 2. As soon as the bridge is rebalanced to this extent, the action previously described will result so that the motor will then be operated only one-fourth of the time and its movement will be considerably slower. It is thus assured that the motor, under all conditions, will rebalance the system without overshooting. This is possible because of the initial rapid movement of the motor with a subsequent slow movement as the bridge approaches balance.

In the discussion so far, it has been assumed that the slider 37 has been moved to the right of contact arm 40. Now let it be assumed that the condition changes in such a manner that the slider 37 moves to the left. The slider 37 will now assume a value which is positive with respect to that of contact arm 40. Under these conditions, the upper end of resistor 44 will be positive and the lower end negative. This results in the potential of grid 20 assuming an even more negative value while the potential of grid 26 is raised with respect to that of the cathode. In other words, the condition indicated in the center portion of Figure 2 now exists in connection with the tube 15. As a result, the tube 15 is conductive one-fourth of the time. Each time that the tube is conductive, current flows over the anode circuit for tube 15 previously traced, which anode circuit includes the armature 13 and the field winding 11. The effect of the energization of field winding 11 is to cause the motor 10 to rotate in a direction opposite to that previously discussed. This results in the controlled device 43 being moved in the opposite direction and in the contact arm 40 of rebalance potentiometer 35 moving to the left so as to rebalance the system.

If the movement of slider 37 to the left is sufficiently great as to cause the bridge 33 to be substantially unbalanced, the condition indicated in the extreme right-hand end of Figure 2 may exist. In other words, the grid potential may be raised sufficiently high as to cause the tube 15 to remain conductive during every cycle.

Under these conditions, the rebalancing action of the motor will be initially more rapid and then slower, as described previously.

It will be seen from the foregoing description that my improved control system causes a control device to be very accurately positioned in accordance with the value of a controlling condition. Any tendency towards overshooting or hunting is avoided by causing the position of the motor to operate only a portion of the time when the unbalance is slight and substantially continuously when the unbalance is great. It will furthermore be seen that, unlike certain systems employing gas filled tubes, the tubes are caused to discharge almost continuously when there is need for continuous operation of the motor. This is due to the fact that the voltage is applied continuously to the plate circuits except for extremely brief intervals.

Figure 3:
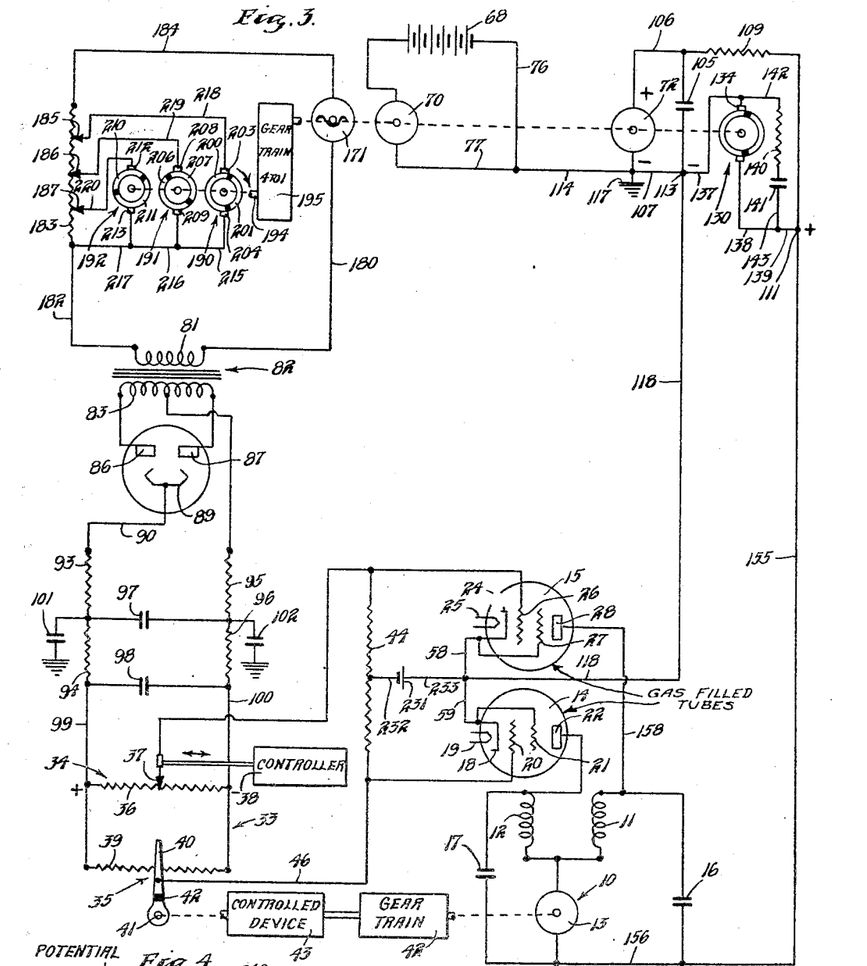
Figure 3 is a schematic view of a modified form of my motor control system.
Figure 4:
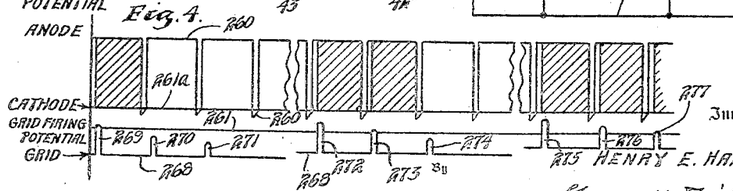
Figure 4 is a diagrammatic representation of the grid and plate voltages in connection with the system of Figure 3.

*Species of Figures 3 and 4*

The species of Figures 3 and 4 differs from that just described in the manner in which the grid voltage is periodically increased. In the arrangement just described, a biasing voltage was periodically reduced for brief periods of time. In the arrangement of Figures 3 and 4, the change in grid voltage is effected by periodically increasing the potential applied to the controlling bridge.

For purposes of simplicity, identical reference numerals have been applied to elements corresponding to elements in the species of Figures 1 and 2. Since the function and construction of these elements with identical reference numerals are the same, it is believed unnecessary to repeat their description in connection with Figures 3 and 4. The motor 10; the controlling bridge consisting of potentiometers 34 and 35; the means for rebalancing the bridge by the motor; the portion of the power supply means from transformer 32 to the bridge; and the Genemotor including motor unit 70, the generator unit 72 and the cycler 130 are all similar to those of Figures 1 and 2 and bear identical reference numerals. The distinguishing features of Figures 3 and 4 will now be described.

The "Genemotor" in the species of Figures 3 not only comprises the direct current motor 70 energized by the battery 68 and the direct current generator 72 but it also comprises an alternating current generator 171 which generates a voltage of relatively high frequency as compared with that generated by generator 71 of Figure 1. Furthermore, the rotary contactor 130 is secured to the "Genemotor" shaft and is driven thereby. Thus, the need for a separate motor such as motor 125, for driving the rotary contactor is eliminated.

The contactor 130 operates in the same manner as in the preceding case to establish periodically a short circuit between the terminals 111 and 113 and hence to remove the voltage from the anodes of tubes 14 and 15. In other words, the pattern of the anode potential is exactly the same as that of the previous species, this pattern being indicated by the line 260 of Figure 4.

In the present species, the grid bias remains unchanged and is supplied by means of a battery 231. This battery is connected by a conductor 232 to the center tap of resistor 44 and by a conductor 233 to the junction of conductors 58 and 59 which in turn are connected to cathodes 18 and 24. The battery 231 hence operates to apply a predetermined negative bias to the grids 20 and 26. If desired, means for obtaining a bias from the battery 68 may be employed in this species. In other words, a potentiometer corresponding to potentiometer 31 may be connected across battery 68 and a variable portion of the voltage existing across this potentiometer may be applied to the grid circuit.

The alternating current generating unit 171, as previously indicated, generates a relatively high frequency current. This generating unit is connected in a circuit with the primary 81 of transformer 82 as follows: from the lower terminal of generator unit 171 through conductor 180, primary winding 81, conductor 182, resistor 183, and conductor 184. The resistor 183 has associated therewith a plurality of sliders 185, 186 and 187. These sliders are associated with rotary contactors 190, 191, and 192. All three rotary contactors are driven by a shaft 194 from the "Genemotor" through a reduction gear train 195. The reduction gear train is so designed that for each four rotations of contactor 130, the shaft 194 is rotated once. In other words, the contactors 190, 191 and 192 are driven only one-fourth as fast as the contactor 130. Rotary contactor 190 consists of a rotor having a pair of arcuate conductive members 200 and 201 separated from each other by insulating material. Associated with the arcuate members 200 and 201 are a pair of brushes 203 and 204. The brushes 203 and 204 are so arranged with respect to the conductive member 200 that twice during each rotation of motor 190, the brushes 203 and 204 are electrically connected by the conductive member 200.

The rotary contactor 91 similarly comprises a rotor having a pair of conductive members 206 and 207 separated from each other by insulating material. Cooperating with this rotor are a pair of brushes 208 and 209. These brushes are likewise arranged so that twice during each rotation of the rotor of contactor 191, the brushes are electrically connected by the conductive member 206.

Similarly, the contactor 192 comprises a plurality of arcuate conductive members 210 and 211 and a pair of brushes 212 and 213 which in two positions of the rotation of the rotor are electrically bridged by the segment 210.

The three contactors 190, 191 and 192 are so arranged that the angular position at which the respective brushes of each contactor are bridged is different for each of the contactors. In other words, as the contactors 192, 191 and 190 rotate in a clockwise direction as indicated by the arrow adjacent contactor 190, the brushes of the contactor 190 are first connected, then the brushes of contactor 191, and finally the brushes of contactor 192.

The three lower brushes 204, 209 and 213 are all connected to the lower terminal of resistor 183 by conductors 215, 216 and 217. The upper brush 203 is connected by conductor 218 to tap 185. The upper brush 208 is connected by conductor 219 to tap 186. The brush 212 is connected by conductor 220 to tap 187. Thus, as the contactors 190, 191 and 192 are rotated in a clockwise direction, various portions of resistor 183 are shorted out. At first, the entire portion of resistor 183 from the lower terminal to tap 185 will be shorted out. Then the portion from the lower terminal to tap 186 will be shorted out. Finally, the portion between the lower terminal and tap 187 will be shorted out. The segments are so spaced that the action so far described takes place over three-eighths of a complete revolution. During the remaining one-eighth of a half revolution, no portion of the resistor 183 is short circuited.

Since resistor 183 is in the circuit to primary 81, it acts to reduce the potential impressed upon primary 81 and hence to reduce the voltage across secondary 83. This, in turn, reduces the voltage applied to the bridge 33. As various portions of the resistor 183 are short circuited, the potential impressed across primary 81 and hence across the bridge 33 is increased. Since such short circuiting action takes place only for a very brief moment, the increase in voltage applied to the bridge will likewise be very short in duration. When the voltage across the bridge 33 is thus momentarily increased, the output voltage resulting from any unbalance of the bridge 33 will be abruptly increased so as to increase the potential applied to the grid by the bridge.

The variation of the grid voltage in the species just described is illustrated in Figure 4. In this figure, the potential of the grid with respect to the cathode is indicated by the line 268. The successive peaks are indicated by the characters 269, 270, and 271 for the first four cycles of anode voltage, by the characters 272, 273 and 274 for the intermediate four cycles, and by the reference characters 275 and 276 in the last group of cycles shown. When there is no unbalance at all, the grid voltage remains at the value determined by the biasing battery 231. Since the bridge is balanced, any increase in voltage applied to this bridge does not in any way affect the potential of grids 20 and 26. If, however, the bridge is slightly unbalanced, the effect of cyclers 190, 191 and 192 is to increase periodically the unbalance voltage so as to result in peaks similar to peaks 269, 270 and 271. In the case shown in the extreme left-hand end of Figure 4, the amount of unbalance is such that when the entire portion of the resistance from the lower terminal to tap 185 is short circuited, the grid potential is increased as indicated by the peak 269. The result of this is that the particular tube in question is rendered conductive during the cycle in which this peak occurs. Under the conditions shown in Figure 4, the peak 270, produced when a short circuit condition is established between the lower terminal of resistor 183 and tap 186, is not sufficient in magnitude to increase the grid potential above the critical grid potential indicated by line 261a. Thus, during this cycle there is no discharge of either tube. During the next cycle, only the portion of resistor 183 between the lower terminal and tap 187 is shorted out. This results in the peak 271. During the next cycle, the full resistor 183 is connected in series with the primary 81 so that there is no increase in the grid potential at all. The result is that both tubes remain non-conductive during the last three of the four cycles. This entire sequence is repeated every four cycles. Thus, as long as bridge unbalance remains the same, the motor is energized one-fourth of the time.

In the middle portion of Figure 4, the condition when the amount of grid voltage is increased, is illustrated. The amount of unbalance has been shown as increased to the point where the first two peaks 272 and 273 are of sufficient magnitude to increase the grid potential above the cut-off value so as to cause the tube whose grid potential is increased to become conductive. These two peaks are those occurring when taps 185 and 186 are connected to the lower terminal of resistor 183. The peak 274 which occurs when tap 187 is connected to the lower terminal is of insufficient magnitude to cause the discharge device in question to discharge. Consequently, under the conditions just considered, the tube is conductive only over two cycles of each four. Under the condition shown in the extreme right-hand end of Figure 4, the peaks 275, 276 and 277 are all of sufficient magnitude to render the discharge device conductive. When however, the full resistor 183 is connected in the circuit the grid voltage is not sufficient to cause the discharge device to be conductive and consequently during the last cycle, the tube is non-conductive. Under these conditions, a discharge occurs through three-quarters of the time. In the extreme case (not shown) when the bridge is very greatly unbalanced, the voltage resulting from this unbalance even when the entire resistor 183 is connected in series with the primary 181 is sufficient to cause the tube whose grid voltage is increased as a result of the unbalance to be continuously conductive. Under such cases, the motor 10 is continuously energized to rebalance the system.

In the foregoing description, no reference has been made to the particular circuits established through tubes 14 and 15. It is to be understood that the operation in this connection is identically the same as in Figures 1 and 2. In other words, when the contactor 37 assumes a position to the right of the contact arm 40, the voltage of grid 20 of tube 14 is increased so as to tend to render this tube conductive. When on the other hand, the slider 37 is to the left of contact arm 40, the potential of grid 26 is raised with respect to that of cathode 24 so as to tend to render tube 15 more conductive. In each case, the motor 10 is driven in such a direction as to rebalance the bridge 33 and to move the control device 43 in a direction to correct for the change of condition originally producing the unbalance. It will be obvious from the description so far that the motor 10 is driven either continuously, three-fourths of the time, one-fourth of the time, or not at all depending upon the extent of the bridge unbalance. In this way, the position of the control device is very quickly adjusted without any tendency towards overshooting.

In the system just described, the increase in grid voltage is obtained by an increase in the voltage applied to the bridge. This has the disadvantage that the peaks vary in magnitude with the extent of unbalance. In most cases, it is more desirable to have superimposed on the normal grid voltage, peaks of constant value such as was done in the species of Figure 1. The periodic increase in the voltage applied to the bridge 33 does, however, have the advantage of increasing the sensitivity of the bridge without increasing the heating of the resistors associated therewith. During the very brief period that the high voltage is applied, the sensitivity of the bridge is increased very materially. This period of application of the high voltage is insufficient, however, to appreciably affect the resistors 36 and 39. This advantage is particularly important where in lieu of a potentiometer for the controlling resistance, a temperature sensitive resistor is employed. In such cases, it is very desirable to have as little heating of the resistance bridge as possible.

While I have shown the provision of peaks of varying magnitudes only in connection with the operation of Figures 3 and 4, it is to be understood that this same expedient could be employed in connection with Figures 1 and 2. In such case, a plurality of cyclers such as cyclers 190, 191 and 192 would be substituted for the single cycler 131 and connections would be made to various points of resistor 121.

Figure 5:
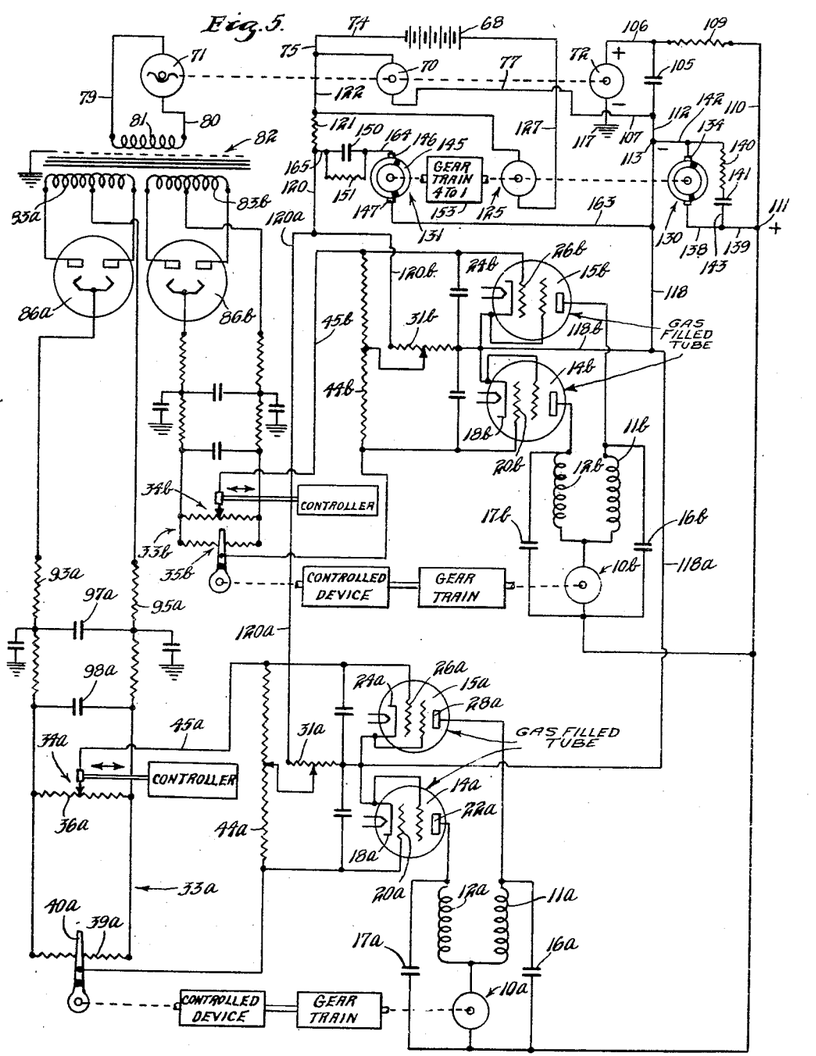
Figure 5 is a schematic representation of a motor control system similar to that of Figure 1 with the exception that it is adapted for the control of two separate motors.

*Species of Figure 5*

The species of Figure 5 is very similar to that of Figures 1 and 2 with the exception that instead of merely providing for the control of one motor, provision is made for the separate control of two motors, the power supply and the various contacting mechanisms being the same. For convenience in understanding the drawing, the elements which serve in connection with both motor control systems are given the identical reference numerals by which they are identified in Figure 1. Those elements of which it is necessary to provide one in connection with each of the two motors are given the same reference numerals as in Figure 1 followed by the suffix letters $a$ and $b$. Thus, there are two motors 10a and 10b. All of the control mechanism employed solely for the control of motor 10a is identified by reference numerals having the suffix letter $a$. All of the control mechanism employed solely for the control of motor 10b is identified by reference numerals having the suffix $b$.

The battery 68, as with the arrangement of Figure 1, is employed to drive a motor 70 of a "Genemotor" having an alternating current generating unit 71 and a direct current generating unit 72. The battery 68 also energizes a direct current motor 125 driving the contactors 130 and 131. The direct current generating unit 72 impresses a voltage across terminals 111 and 113 which is applied to the plate circuits of tubes 14a, 15a, 14b, and 15b. As described in connection with Figure 1, the contactor 130 operates periodically to short circuit this voltage at short intervals of time and permit the condensers 16a, 17a, 16b, and 17b to apply reverse voltages to the plate circuits. The potentiometer 31a is connected across battery 68 and is employed to apply a bias to grids 20a and 26a. Similarly, the potentiometer 31b is connected across battery 68 and is employed to apply a bias to grids 20b and 26b. The contactor 131 serves to periodically short circuit the potentiometers 31a and 31b so as to increase substantially the potential applied to grids 20a and 26a and also to grids 20b and 26b.

The output voltage of bridge 33a is applied across resistor 44a to raise and lower the potentials applied to grids 20a and 26a. Similarly, the output potential of bridge 33b is applied across resistor 44b to affect the potential applied to grids 20b and 26b.

The operation of each of the motor control systems is identical to that of Figure 1. In each case, a direct current voltage is applied from the power common source to the two sets of gas filled tubes. The grids are normally subjected to a potential which is due to the combined effect of the biasing potentiometer and to the unbalance voltage across the bridge. Once each four cycles of anode voltage, the biasing potential is removed for a short period of time to increase suddenly the grid voltage. If, when this is done the unbalance is only slight, this increase in the grid voltage causes one or the other of the tubes to discharge depending upon the direction of unbalance of the bridge. When this unbalance is only slight, the discharge will only occur during the cycle in which the grid voltage is peaked. When the unbalance is great, however, the unbalance potential in itself is sufficient to overcome the biasing potential so that the tube remains conductive for the entire time except for the brief intervals during which the plate voltage is removed therefrom.

It will be seen that with the arrangement of Figure 5, it is possible to employ the same source of power, the same contacting mechanism, and the same generators for controlling both motors. Due to the careful shielding and filtering, the operation of the one control system does not affect the operation of the other despite the extreme sensitivity of the gas filled electronic discharge devices. The ability to use the same source of power, the same generators, and the same contacting mechanism becomes very important in connection with applications requiring the independent control of three or four motors in a location where space or weight is limited. A typical application in which this problem is present is that of controlling various elements in an airplane. Such a system as I have shown is admirably adapted for this application because of the extreme speed of response and because of the possibility of employing one generating and contacting equipment for all of the motor control systems. It is the latter equipment which tends to be heavier. Thus, the ability in an airplane to use this equipment for a number of motor control systems is highly advantageous.

*Conclusion*

It will be seen that I have provided a new and novel motor control system which is extremely sensitive and which permits rapid positioning of the motor with no danger of overshooting.

While I have shown certain specific embodiments of my invention for purposes of illustration, it is to be understood that the invention is to be limited only by the scope of the appended claims.

I claim as my invention:

1. In motor controlling apparatus for motor means having a pair of current paths associated therewith and operable to rotate in one direction or the other depending upon whether the current flow through one of said paths is greater or less than that through the other, a pair of electronic discharge devices each having a control element for controlling the discharge thereof, each of said devices being adapted to control the current flow through a different one of said two current paths, means for applying variable control voltages to the control elements of said discharge devices, and means for increasing the effect of control voltages of small magnitude, said last named means including means for periodically increasing the magnitude of the voltage applied to said control elements for a relatively brief interval of time.

2. In motor controlling apparatus for motor means having a pair of current paths associated therewith and operable to rotate in one direction or the other depending upon whether the current flow through one of said paths is greater or less than that through the other, a pair of gas filled electronic discharge devices each having a control element for controlling the discharge thereof, each of said devices adapted to control the current flow through a different one of said two current paths, means for applying a direct current voltage to the output circuits of said discharge devices continuously except for periodic intervals of time of relatively short length, means for applying a voltage of the opposite polarity to said output circuits during said intervals of time, and means for applying a variable control voltage to the control elements of said discharge devices.

3. In motor controlling apparatus for motor means having a pair of current paths associated therewith and operable to rotate in one direction or the other depending upon whether the current flow through one of said paths is greater or less than that through the other, a pair of gas filled electronic discharge devices each having an output circuit and a control element for controlling the discharge thereof through said output circuit, each of said devices being adapted to control the current flow through a different one of said two current paths, means in said output circuits for applying a direct current voltage to said output circuit continuously except for periodic intervals of time of relatively short length, means for applying variable control voltages to the control elements of said discharge devices, and means for periodically increasing the magnitude of the voltages applied to said control elements for a relatively brief interval of time.

4. In motor controlling apparatus for motor means having a pair of current paths associated therewith, and operable to rotate in one direction or the other depending upon whether the current flow through one of said paths is greater or less than that through the other, a pair of gas filled electronic discharge devices each having an output circuit and a control element for controlling the discharge thereof through said output circuit, each of said devices being adapted to control the current flow through a different one of said two current paths, means in said output circuits for applying a direct current voltage to said output circuits continuously except for periodic intervals of time of relatively short length, means for applying variable control voltages to the control elements of said discharge devices, and means for periodically increasing the magnitude of the voltages applied to said control elements for a relatively brief interval of time.

5. In combination, current responsive means, an impedance bridge having input terminals and output terminals, means for controlling the energization of said current responsive means in accordance with the voltage across said output terminals, means for continuously applying a voltage to the input terminals, and means for periodically increasing the voltage applied by said last named means for intervals the duration of which is a small fraction of the duration of the intervening periods of normal voltage, the magnitude of the voltage increase being different during successive intervals.

6. In motor controlling apparatus for controlling a plurality of motors, a plurality of electronic discharge devices, each having an input circuit and an output circuit adapted to control the energization of one of said motors, a single source of power, means including said source of power for applying a substantially constant direct current voltage to the output circuits, means for periodically and simultaneously interrupting the application of said voltage to all of said output circuits, a plurality of main controllers, one for each of said motors, and means associated with each of said main controllers and energized by said source of power for applying a voltage to the input circuit of said discharge device to vary the energization of the associated motor in accordance with the condition of the main controller, the magnitude of said voltage being dependent upon the condition of the main controller.

7. In motor controlling apparatus for controlling a plurality of motors, a plurality of electronic discharge amplifiers each having an input circuit and an output circuit adapted to control the operation of a motor, a single source of power, means including said source of power for applying a voltage to the output circuits of said amplifiers, a plurality of main controllers, one for each of said motors, means associated with each of said main controllers and energized by said source of power for applying a voltage to the input circuit of said discharge device, the magnitude of said voltage being dependent upon the condition of said main controller so that the associated motor is energized in accordance with the condition of said main controller, and means energized by said source of power for periodically superimposing on said control voltage a direct current voltage.

8. In combination, an electronic discharge amplifier having an input circuit and an output circuit, a primary source of voltage, a motor energized by said source, means operated by said motor for generating a voltage of the proper characteristics for the output circuit of said amplifier, means for applying said voltage to said output circuit for time intervals of predetermined length, means including a condition responsive controller for applying to the input circuit of said amplifier a control voltage whose magnitude is dependent upon the value of the condition to which said controller responds, and means including a contactor driven by said motor for periodically changing the value of said control voltage for intervals relatively small in length compared to the intervals during which said voltage is applied to said output circuit.

9. In combination, an electronic discharge amplifier having an input circuit and an output circuit, a primary source of voltage, a motor energized by said source, means including a condition responsive controller for applying to the input circuit of said amplifier a control voltage whose magnitude is dependent upon the value of the condition to which said controller responds, said last named means including resistance means and means including a contactor driven by said motor for periodically shunting variable portions of said resistance means to change the value of said control voltage.

10. In a motor control system, a motor means, a device positioned thereby, means for energizing at least a portion of said motor means for varying portions of predetermined periods of time to vary the total movement of said device by said motor means occurring during each of said periods of time, said controlling means including a gas filled electronic discharge amplifier having an input circuit and an output circuit controlling the energization of said portion of said motor means, said output circuit including means for supplying a substantially constant unidirectional voltage thereto, means in said input circuit for supplying a variable controlling voltage thereto to affect the current flow in said output circuit and hence to vary the energization of said portion of said motor means, means unaffected by the magnitude of the voltage supplied to said input circuit for periodically interrupting the supply of said unidirectional voltage to said output circuit, and means for momentarily supplying a voltage of the opposite polarity to said output circuit following each such interruption.

11. In a motor control system, a motor means, a device positioned thereby, means for energizing at least a portion of said motor means for varying portions of predetermined periods of time to vary the total movement of said device by said motor means occurring during each of said periods of time, said controlling means including an electronic discharge device having an input circuit and an output circuit controlling the energization of said portion of said motor means, said output circuit including means for supplying a substantially constant unidirectional voltage thereto except for periodic intervals, means in said input circuit for supplying a variable controlling voltage thereto, and means for periodically increasing the magnitude of the voltage applied to said input circuit for relatively brief intervals of time so as to periodically cause current flow through said output circuit when the value of said variable controlling voltage is such that said current flow would not otherwise take place.

12. In a motor control system of the follow up type, a motor means, a device positioned thereby, means for so controlling the energization of said motor means as to control the extent and direction of movement of said device by said motor means, said last named means comprising an electronic discharge amplifier having an output circuit controlling the energization of said motor means and a control element controlling the flow of current through said output circuit, means for applying a signal voltage to said control element, said last named means comprising an impedance bridge including one impedance element variable in accordance with the value of a controlling condition and a further impedance element variable in accordance with the position of said motor means, means for applying an input voltage to said bridge, and means for periodically increasing said input voltage momentarily to momentarily increase said signal voltage applied to said control element.

13. In combination, an electronic discharge amplifier having an output circuit adapted to control the energization of a load, said amplifier comprising a control element for controlling the discharge thereof, means in said output circuit for applying a voltage to said output circuit continuously except for periodic intervals of time of relatively short length to provide a plurality of cycles of output circuit voltage, means for applying a variable control voltage to said control element of said discharge device, and means periodically operative only during certain of said cycles of said output circuit voltage to increase the magnitude of the voltage applied to said control element for a relatively brief period of time, the magnitude of said increase being insufficient in the absence of a control voltage to render said amplifier conductive so that when said control voltage is relatively small, said amplifier is conductive only during said certain cycles but is not conductive during the remainder.

14. In combination, an electronic discharge amplifier having an output circuit adapted to control the energization of a load, said amplifier comprising a control element for controlling the flow of current through said output circuit, means in said output for cyclically applying a voltage to said output circuit, means for applying a variable control voltage to said control element of said discharge device, and means periodically operative only during certain of said cycles of said output circuit voltage to increase the magnitude of the voltage applied to said control element for a relatively brief period of time, the magnitude of said increase being insufficient in the absence of a control voltage to render said amplifier conductive so that when said control voltage is relatively small, said amplifier is conductive only during said certain cycles but is not conductive during the remainder.

15. In combination, a gas filled electronic discharge device having an output circuit adapted to control the energization of a load, said discharge device comprising a control element for controlling the discharge thereof, means in said output circuit for cyclically applying a voltage to said output circuit, means for applying a variable control voltage to said control element of said discharge device, and means operative during only certain of the cycles of said output circuit voltage to successively change the magnitude of the voltage applied to said control element by different amounts during successive cycles of said output circuit voltage and for fixed periods of time, the greatest change being insufficient in the absence of a control voltage to cause discharge of said discharge device, so that when said control voltage is relatively small said discharge device discharges during part or all of said certain cycles but does not discharge during the remainder.

16. In combination, a gas filled discharge device having an output circuit adapted to control the energization of a load, said discharge device comprising a control element for controlling the discharge thereof, said output circuit including means for applying a voltage to said output circuit continuously except for periodic intervals of time of relatively short length so as to provide a plurality of cycles of output circuit voltage, means for applying a variable control voltage to said control element of said discharge device, and means operative during only certain of the cycles of said output circuit voltage to successively change the magnitude of the voltage applied to said control element by different amounts during successive cycles of said output circuit voltage and for fixed periods of time, the greatest change being insufficient in the absence of a control voltage to cause discharge of said discharge device, so that when said control voltage is relatively small said discharge device discharges during part or all of said certain cycles but does not discharge during the remainder.

17. In a motor control system of the follow up type, a motor means, a device positioned thereby, a balanceable impedance network comprising a control impedance continuously variable in accordance with variation in the value of a controlling condition and a rebalancing impedance variable in accordance with the position of said motor means, said network having input and output terminals, means having continuous connections to said input terminals for continuously applying a voltage thereto, means for periodically increasing the voltage applied by said last named means for intervals, the duration of which is a small fraction of the duration of the intervals of normal voltage, without interrupting said connections to said input terminals, current controlling means for so controlling the energization of said motor means as to control the extent and direction of movement of said device by said motor means, and means responsive to the voltage across the output terminals of said network for controlling the operation of said current controlling means.

HENRY E. HARTIG.

REFERENCES CITED

The following references are of record in the file of this patent:

UNITED STATES PATENTS

| Number | Name | Date |
|---|---|---|
| 1,867,398 | Cockrell | July 12, 1932 |
| 1,904,485 | Livingston | Apr. 18, 1933 |
| 1,914,481 | Brown | June 20, 1933 |
| 1,957,016 | Loudon | May 1, 1934 |
| 1,960,350 | Shackleton | May 29, 1934 |
| 1,977,256 | Swart | Oct. 16, 1934 |
| 2,047,984 | Riggs | June 21, 1936 |
| 2,085,100 | Knowles et al. | June 29, 1937 |
| 2,100,460 | Specht | Nov. 30, 1937 |
| 2,161,693 | Baier | June 6, 1939 |
| 2,164,728 | Wey | July 4, 1939 |
| 2,175,920 | Schnarz | Oct. 10, 1939 |
| 2,175,921 | Schnarz | Oct. 10, 1939 |
| 2,242,948 | Gulliksen | May 20, 1941 |
| 2,246,905 | Uehling | June 24, 1941 |
| Re. 22,123 | Edgerton | June 23, 1942 |

OTHER REFERENCES

"Hot Cathode Thyratrons," General Electric Review, vol. 32, No. 7, July 1929, pages 390-399.